May 3, 1955        H. ST. PIERRE        2,707,411
TIRE CHAIN APPLYING MEANS
Original Filed May 19, 1947        2 Sheets-Sheet 1
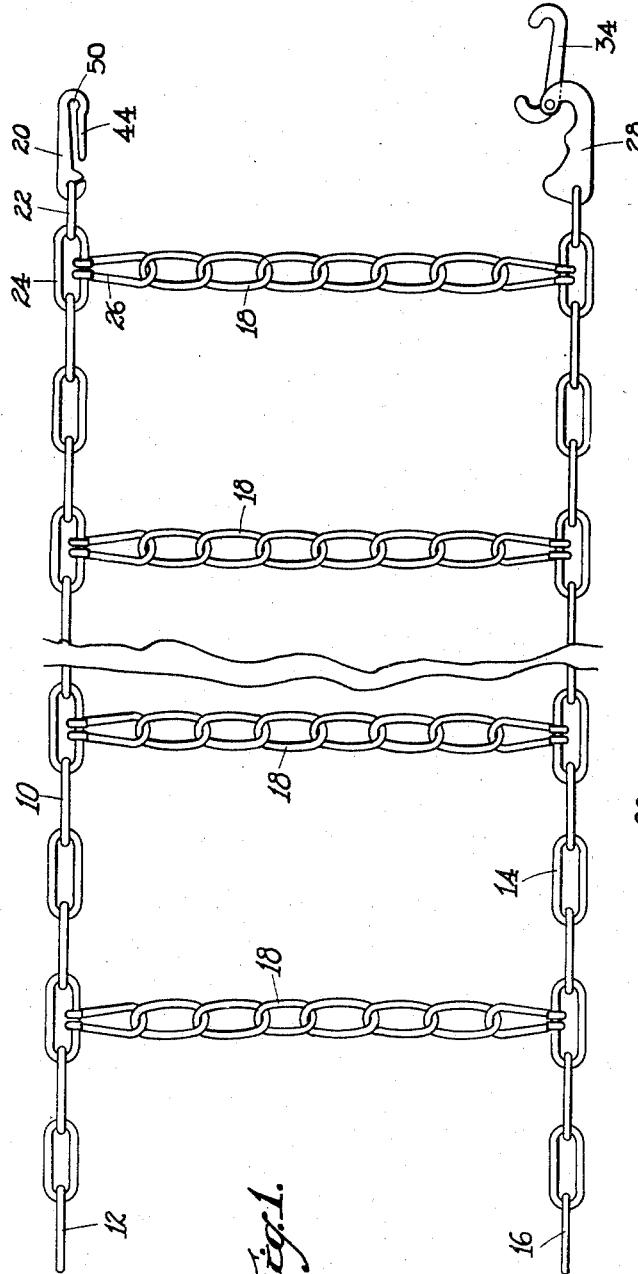
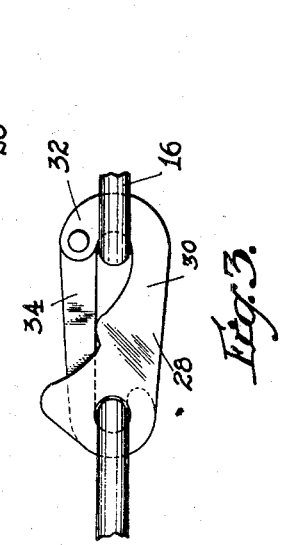
INVENTOR.
Henry St. Pierre
BY

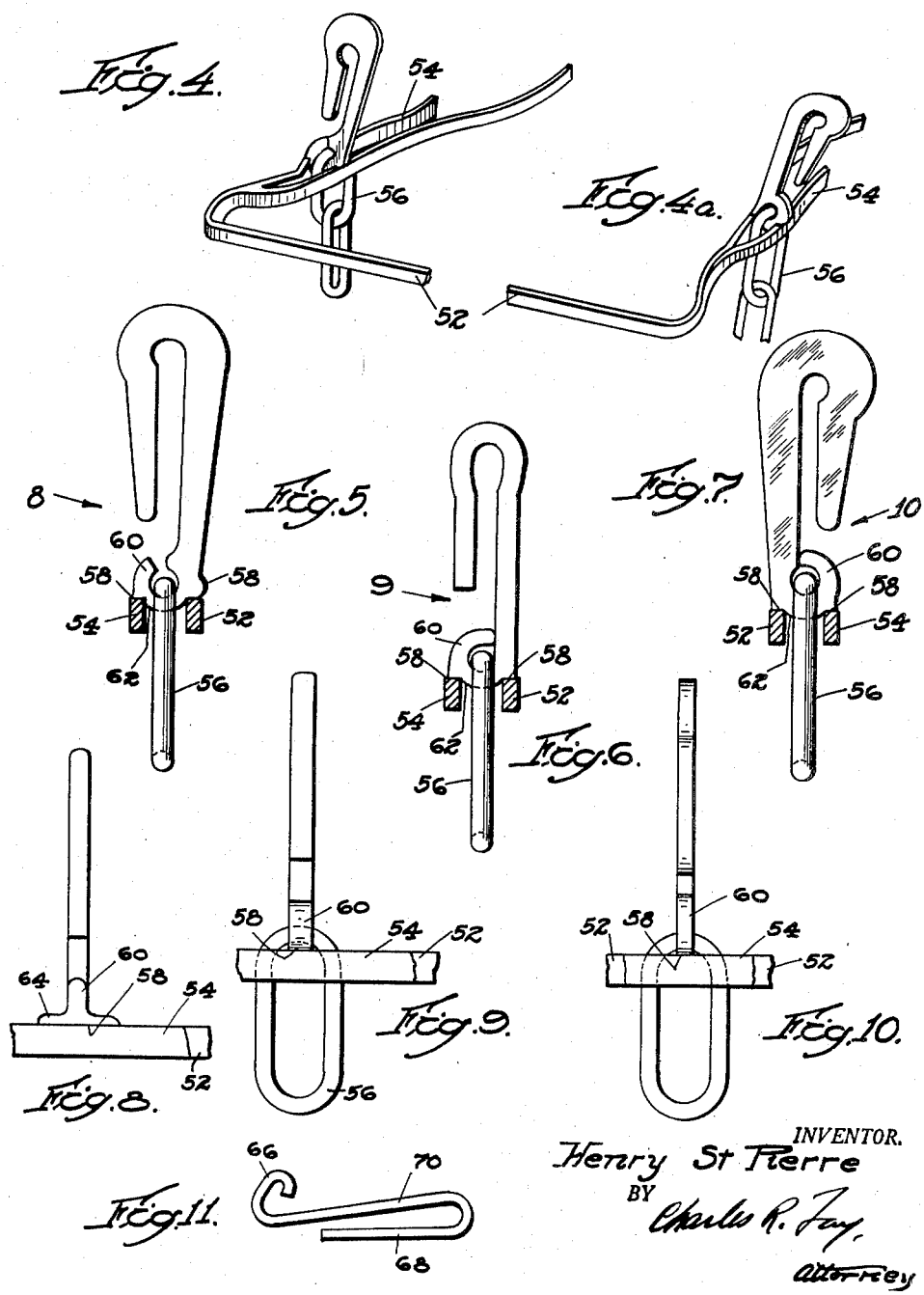

United States Patent Office 2,707,411
Patented May 3, 1955

2,707,411
TIRE CHAIN APPLYING MEANS

Henry St. Pierre, Worcester, Mass.

Continuation of application Serial No. 748,885, May 19, 1947. This application December 17, 1949, Serial No. 133,529

1 Claim. (Cl. 81—15.8)

This application relates to tire chain applying devices or the like and the objects of the invention include the provision of a tire chain applying tool, and a tire chain having side and cross chains, one side chain having a plain end link at one end and a new and novel connecting hook at the other end thereof, the other side chain having a plain end link at one end and an adjustable chain take-up fastener at the other end thereof, said fastener being of conventional design if desired, the chain applying tool being disposed on the tire and the side chain having the hook being disposed at the inside aspect thereof, the hook being easily and quickly supported in upstanding condition on the applying tool so that it may be inserted in a link in its side chain without the necessity of getting under the vehicle and in fact necessitating only the operator's hand reaching in slightly behind the tire to grasp the end link in the fingers and "thread" the point of the hook therein, whereupon the take-up fastener is operated at the outside aspect of the tire to tighten the entire chain on the tire.

Further objects of the invention include the provision of a tire chain applying tool and hook as above stated wherein the hook is securely held on the tool by the weight of the chain attached thereto, and will not accidentally escape therefrom while the chain is being applied to the tire.

Other objects and advantages of the invention will appear hereinafter.

Reference is to be had to the accompanying drawings in which

Fig. 1 is a plan view of a chain according to the invention;

Fig. 2 is an enlarged view of the hook;

Fig. 3 is an enlarged view of the chain take-up fastener;

Figs. 4 and 4a are perspective views illustrating the hook in use;

Figs. 5, 6, and 7 are views in side elevation of different forms of hooks;

Figs. 8, 9 and 10 are edge views of the hooks of Figs. 5, 6, and 7 respectively; and Fig. 11 is a view of a still further form of hook.

As shown in Fig. 1, the present invention contemplates the use of an inside side chain composed of a series of links as is conventional and having at one end thereof a plain link 12. The other side chain 14 is similar to chain 10 and is also provided with a plain end link 16. The two side chains are connected at regular spaced intervals by a series of cross chains 18, there usually being thirteen of these cross chains which take all the chain wear and abrasion on the wheel of the vehicle.

The inside side chain 10 terminates at its end opposite plain link 12 in a hook 20 and this hook is connected by a link 22 to a link 24 to which a cross chain 18 is secured, as by a conventional hook 26, whereby it will be seen that the hook 20 is secured very close to the nearest cross chain 18.

The outside side chain 14 terminates in an adjustable take-up fastener or chain connector 28 which is also located very close to the nearest cross chain 18. This chain connection 28 comprises a body 30 having a hook portion 32 to which is pivoted a long hook 34, and as in conventional in the art the link 16 is hooked over hook 34 and drawn up as by a leverage action to the point of closing illustrated in Fig. 3, so that it is seen that any looseness in the chain may be compensated for by judicious selection of the link of the side chain used for fastening at the outside aspect of the wheel.

The hook 20 is provided with an eye 36 having a split 38 leading thereinto, the hook being made originally with the split 38 wide enough to insert over the wire of link 22, and then the split 38 is reduced to the form shown in Figs. 1 and 2 by means of a hammer or pliers so that the hook is permanently attached. Hook 20 is provided with an elongated body 40 which, however, is no longer than three or four of the side chain links so that in no case does the hook have a length as great as the distance between cross chains. Due to this construction, the cross chain need not be reduced in number by the use of the hook connection.

The body 40 of hook 20 extends transversely and is tapered off as at 42 and then extends back toward the eye 36 terminating in a point 44 leaving an entrance between the point and the eye just sufficient to insert the wire of link 12. The point 44 is provided with a straight edge 46 spaced from a corresponding edge 48 on the body 40, the distance between edges 46 and 48 being just about sufficient to receive the wire of link 12. This construction forms a narrow passage which terminates in an enlargement 50 at the bight of the hook. This enlargement receives the wire of link 12 and retains the same against escape when the take-up connector 28 has been actuated as above described at the exterior aspect of the wheel.

The novel hook herein disclosed is to be used with the chain applying tool 52 which is generally U-shaped and grips the tire between the arms of the U. Spaced side arms 54 hold the hooks as will be described, and the chain links 56 hang down therefrom, see Figs. 4–10 inclusive.

The hooks of Figs. 4–10 inclusive all have an additional feature in common not heretofore disclosed, and this feature resides in the formation of spaced shoulders 58 on the eyes 60, the spacing between the shoulders being substantially equal to that between the arm 54 and main portion of the tool 52, the shoulders being flat to rest on the surfaces of these tool parts so that the hook may rest thereon and be held upright as by the weight of the chain 56. The bulges or curved portions 62 are disposed between the tool parts 52 and 54 and tend to prevent displacement in a transverse direction.

In addition, if desired, ears or lugs 64 may be provided to rest on the tool parts 52 and 54 to enhance the stabilizing effects of the shoulders.

Fig. 11 illustrates a hook like the others but with the eye 66 thereof reversed relative to the point 68, merely to show that the eye and point need not necessarily be formed at the same side of the body portion 70, although the construction of the hook is preferred as shown in Figs. 1–10.

The operator grasps the hook and places it on the chain applying tool in the positions shown in Fig. 4 for a right rear wheel and Fig. 4a for a left rear wheel. The hook balances on the arms 54 and side runs of tool 52, and is held in that position by the weight of the chain. The vehicle is then moved forwardly a distance equal to the tire circumference, bringing the tool 52 and hooks back to original position after draping the entire chain over the tire. The operator then takes the now dangling plain end link 12, which comprises the other end of chain 56, and slips it over the point 44 of the hook; this threaded on link stays in position as long as necessary to finish securing the chain to the tire. The chain holds the hook to the tool and the hook holds the chain.

With the inside side chain completely secured, but loose; the adjustable take-up connector 28 is then operated as above described, and this not only tightens the outside side chain but also completely tightens the inside side chain so that the entire chain is firmly held to the tire and the hook cannot escape. The tool 52 is then merely slid off the tire.

This invention will be seen to provide a tire chain which is extremely easy to apply with no need of crawling under a vehicle, and conversely the chain is extremely easy to take up because the take-up fastener at the outside of the wheel is obviously easy to release, whereupon the hook is easily disengaged from the link 12. At the same time there is no danger of disconnection of the hook even on rough roads, and as many cross chains may be used as desired with no gaps, such a gap being necessary with prior art devices using a "rod-hook."

The same invention is also applicable to dual tire chains, it merely being necessary to connect the required extra cross chains to the side chain 10 and then to duplicate the outside side chain 14, thus providing two outside side chains with take-up fasteners and a center chain, lying between the dual tires and provided with the hook.

This application is a continuation of my prior application Serial No. 748,885, filed May 19, 1947, and now abandoned.

Having thus described my invention and the advantages thereof, I do not wish to be limited to the details herein disclosed, otherwise than as set forth in the claim, but what I claim is:

In combination, a tire chain applying tool including a pair of spaced arms slidably receiving a link of a chain therebetween, with a hook comprising a pair of spaced shoulders each of which rests on a separate arm of the tool with the hook held thereon in upright position by the weight of the chain dangling therefrom, the hook being connected to said link.

References Cited in the file of this patent

UNITED STATES PATENTS

| | | |
|---|---|---|
| 1,190,816 | Thompson | July 11, 1916 |
| 2,213,910 | Higgins et al. | Sept. 3, 1940 |
| 2,478,335 | Stark | Aug. 9, 1949 |

OTHER REFERENCES

Popular Science Magazine, page 155, November 1947 issue.